United States Patent
Kuboshima et al.

(10) Patent No.: US 6,962,046 B2
(45) Date of Patent: Nov. 8, 2005

(54) EXHAUST GAS CLEANING SYSTEM HAVING PARTICULATE FILTER

(75) Inventors: Tsukasa Kuboshima, Okazaki (JP); Shinichiro Okugawa, Toyota (JP); Makoto Saito, Okazaki (JP); Shigeto Yahata, Kariya (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 10/461,394

(22) Filed: Jun. 16, 2003

(65) Prior Publication Data

US 2003/0230079 A1    Dec. 18, 2003

(30) Foreign Application Priority Data

Jun. 14, 2002 (JP) .............................. 2002-174485

(51) Int. Cl.[7] .............................................. F01N 3/00
(52) U.S. Cl. ........................... 60/295; 60/274; 60/277; 60/286; 60/297; 55/DIG. 30
(58) Field of Search .......................... 60/274, 276, 286, 60/295, 297, 311, 277; 55/DIG. 30

(56) References Cited

U.S. PATENT DOCUMENTS

| | | | |
|---|---|---|---|
| 5,319,930 A * | 6/1994 | Shinzawa et al. | 60/286 |
| 5,364,321 A * | 11/1994 | Togai et al. | 477/42 |
| 6,405,528 B1 * | 6/2002 | Christen et al. | 60/295 |
| 6,438,948 B2 * | 8/2002 | Ono et al. | 60/311 |
| 6,622,480 B2 * | 9/2003 | Tashiro et al. | 60/295 |
| 6,698,192 B2 * | 3/2004 | Ootake | 60/297 |
| 2003/0131592 A1 * | 7/2003 | Saito et al. | 60/295 |
| 2003/0188518 A1 * | 10/2003 | Itoyama et al. | 55/282.3 |
| 2004/0134187 A1 * | 7/2004 | Inoue et al. | 60/291 |

FOREIGN PATENT DOCUMENTS

JP    7-332065    12/1995

* cited by examiner

*Primary Examiner*—Tu M. Nguyen
(74) *Attorney, Agent, or Firm*—Nixon & Vanderhye P.C.

(57) ABSTRACT

An electronic control unit (ECU) of an exhaust gas cleaning system for an internal combustion engine having a diesel particulate filter (DPF) determines whether collection quantity of exhaust particulate matters collected by the DPF is greater than a regeneration start value or not. The collection quantity is calculated from a pressure difference at the DPF and a flow rate of exhaust gas. If the collection quantity is determined to be greater than the regeneration start value, the ECU increases the temperature of the DPF to regenerate the DPF. The regeneration start value is set smaller as the detection accuracy of the collection quantity decreases. The regeneration start value is set smaller as the exhaust gas flow rate decreases and a rate of change in an accelerator position increases.

20 Claims, 12 Drawing Sheets

EXHAUST GAS CLEANING SYSTEM HAVING PARTICULATE FILTER

CROSS REFERENCE TO RELATED APPLICATION

This application is based on and incorporates herein by reference Japanese Patent Application No. 2002-174485 filed on Jun. 14, 2002.

BACKGROUND OF THE INVENTION

1. Field of the Invention

The present invention relates to an exhaust gas cleaning system of an internal combustion engine, in particular, to a method of regenerating a particulate filter.

2. Description of Related Art

Lately, improvement in exhaust emission of an internal combustion engine mounted on a vehicle and the like is required. Specifically, exhaust particulate matters such as soot or a soluble organic fraction included in the exhaust gas discharged from a compression-ignition type diesel engine running on diesel oil should be removed, as well as carbon oxide, hydrocarbon and nitrogen oxide. Therefore, a particulate filter made of a porous material is disposed in an exhaust passage of the diesel engine for collecting the exhaust particulate matters included in the exhaust gas.

When the exhaust gas passes through porous filter walls of the particulate filter, the particulate matters included in the exhaust gas are filtered at surfaces or pores of the filter walls. If an excessive quantity of the particulate matters is collected, flow resistance at the particulate filter may increase. As a result, back pressure of the engine may be increased, and the engine output may be decreased. Therefore, ability of the particulate filter to collect the exhaust particulate matters should be recovered by regenerating the particulate filter. The particulate filter is regenerated by eliminating the collected exhaust particulate matters.

A particulate filter having an oxidation catalyst such as platinum thereon can be regenerated during the operation of the engine with the use of an oxidization effect of the oxidization catalyst. For instance, a post-injection for injecting fuel in an expansion stroke of the engine is performed at a predetermined timing in order to provide the fuel to the particulate filter. The temperature of the oxidization catalyst is increased with the use of heat, which is generated, by combusting the fuel. Thus, the collected particulate matters are eliminated. Otherwise, the timing of the normal fuel injection is retarded to decrease an efficiency of the engine. Thus, waste heat, which is not converted into motive energy, is increased, and the temperature of the oxidization catalyst is increased with the use of the waste heat. Thus, the particulate matters depositing in the particulate filter are combusted and eliminated.

In a method disclosed in Japanese Patent Unexamined Publication No. H07-332065, timing for regenerating the particulate filter is determined based on a pressure difference between an inlet and an outlet of the particulate filter. More specifically, it is determined that the particulate filter should be regenerated, if the pressure difference exceeds a predetermined value. The above method is based on the fact that the pressure difference between the inlet and the outlet of the particulate filter increases as the flow resistance increases. If the regeneration of the particulate filter is performed frequently, fuel consumption may be increased. Therefore, preferably, the predetermined value should be set as high as possible in a permissible range in order to reduce the frequency of the regeneration.

However, in the above method, the pressure difference decreases if the flow rate of the exhaust gas passing through the particulate filter decreases. In such a case, there is a possibility that the quantity of the collected particulate matters cannot be measured with adequate accuracy.

Therefore, there is a possibility that the detected pressure difference does not exceed the predetermined value even if the quantity of the collected particulate matters is above an upper limit, above which the regeneration of the particulate filter is required. In such a case, when it is determined that the regeneration should be performed afterward, the quantity of the collected particulate matters may be excessive. As a result, the particulate matters may burn rapidly in the regeneration, and the particulate filter may be heated up to an abnormally high temperature, damaging itself.

SUMMARY OF THE INVENTION

It is therefore an object of the present invention to provide an exhaust gas cleaning system for an internal combustion engine, which is capable of providing a proper frequency of regeneration of a particulate filter.

According to an aspect of the present invention, an exhaust gas cleaning system for an internal combustion engine has a particulate filter disposed in an exhaust pipe for collecting particulate matters included in the exhaust gas. The particulate filer is regenerated at a predetermined timing by eliminating the collected particulate matters. The exhaust gas cleaning system has operating state detecting means, collecting state parameter calculating means, detection accuracy determination value calculating means, regeneration start value resetting means, regeneration determining means and regeneration starting means. The operating state detecting means detects an operating state of the engine. The collecting state parameter calculating means calculates a colleting state parameter, which increases as a collection quantity of the collected particulate matters increases, based on the detected operating state. The detection accuracy determination value calculating means calculates a detection accuracy determination value based on the detected operating state. The detection accuracy determination value is used as a reference of the detection accuracy of the collecting state parameter. The regeneration start value resetting means resets the regeneration start value in accordance with the detection accuracy determination value so that the regeneration start value is decreased as the detection accuracy of the collection quantity decreases. The regeneration determining means determines whether the collecting state parameter is greater than the regeneration start value or not. The regeneration starting means starts the regeneration of the particulate filter if the collecting state parameter is determined to be greater than the regeneration start value.

The regeneration start value is decreased as the detection accuracy of the collecting state parameter decreases. As a result, the regeneration timing is not delayed so much even if the collection quantity is calculated smaller than the actual quantity due to the low detection accuracy.

According to another aspect of the present invention, the exhaust gas cleaning system allows the regeneration of the particulate filter under a condition that a total period, in which the collecting state parameter is greater than the regeneration start value, is longer than a predetermined period.

Thus, even when detection accuracy is low, necessity of the regeneration can be determined appropriately, like the case in which the detection accuracy is high.

More specifically, there is a possibility that the regeneration is started due to a noise of sensors and the like, in the case where the system is set to start the regeneration if the collecting state parameter exceeds the regeneration start value even extemporaneously. As a result, fuel consumption may be deteriorated.

Therefore, in the present invention, the regeneration is performed only when the total period, in which the collecting state parameter is greater than the regeneration start value, exceeds a predetermined period. Thus, the regeneration is performed only when the regeneration is actually required, inhibiting the deterioration in the fuel consumption.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF THE REFERRED EMBODIMENT (First Embodiment)

Figure 1:
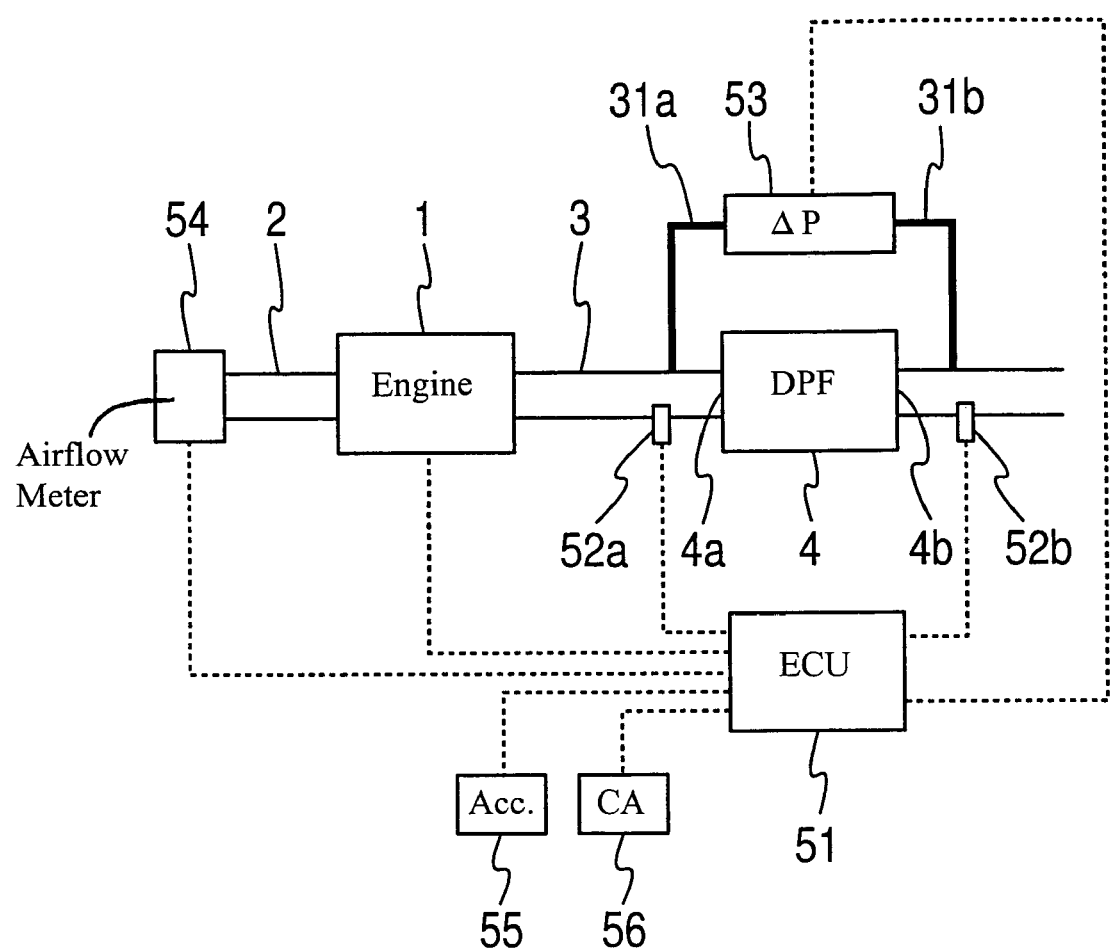
FIG. 1 is an internal combustion engine having an exhaust gas cleaning system according to a first embodiment of the present invention.

Referring to FIG. 1, a diesel engine having an exhaust gas cleaning system according to the first embodiment is illustrated. An engine main body is connected with an intake passage 2, through which intake air passes, and with an exhaust passage 3, through which exhaust gas passes. A diesel particulate filter (DPF) 4 is disposed in the exhaust passage 3. A filter main body of the DPF 4 is a honeycomb made of a porous ceramics such as cordierite or silicon carbide. An inlet or an outlet of each passage of the honeycomb body is blocked. The exhaust gas from the respective cylinder of the engine 1 enters the DPF 4 through an inlet 4a and passes through porous filter walls, then, flows downstream through an outlet 4b of the DPF 4. At that time, exhaust particulate matters included in the exhaust gas are collected by the DPF 4, and deposit in the DPF 4. An oxidization catalyst, whose main component is a noble metal such as platinum or palladium, is supported on a surface of the filter main body of the DPF 4. Thus, the oxidization catalyst eliminates the collected particulate matters by oxidization and combustion under predetermined temperature conditions.

An electronic control unit (ECU) 51 for controlling various parts of the engine main body 1 such as injectors is disposed. The ECU 51 has a general structure, which mainly includes a microcomputer.

The ECU 51 receives various signals indicating an operating state of the engine. For instance, the ECU 51 receives signals from temperature sensors 52a, 52b as means for measuring temperature of the exhaust gas. The temperature sensors 52a, 52b are disposed so that they penetrate a passage wall of the exhaust passage 3. The temperature sensor 52a is disposed just upstream of the DPF 4. The temperature sensor 52b is disposed just downstream of the DPF 4. The upstream temperature sensor 52a measures DPF inlet temperature, or the temperature of the passing exhaust gas at the inlet 4a of the DPF 4. The downstream temperature sensor 52b measures DPF outlet temperature, or the temperature of the passing exhaust gas at the outlet 4b of the DPF 4.

DPF temperature T is calculated from the DPF inlet temperature and the DPF outlet temperature. The DPF temperature T represents temperature of the DPF 4. The DPF temperature T is an averaged value of the DPF outlet temperature and an output value provided by applying a first order lag filter calculation to the DPF inlet temperature. The DPF inlet temperature is applied with the first order lag filter calculation in order to eliminate an effect of its fluctuation, which depends on a discharging state of the exhaust gas. Depending on required specifications, the DPF temperature T may be simply an averaged value or a weighted average of the DPF inlet temperature and the DPF outlet temperature. Any temperature may be employed if it represents the temperature of the DPF 4.

A first branch passage 31a and a second branch passage 31b are connected to the exhaust passage 3. The first branch passage 31a branches from the exhaust passage 3 at a just upstream portion relative to the DPF 4. The second branch passage 31b branches from the exhaust passage 3 at a just downstream portion relative to the DPF 4. A pressure difference sensor 53 disposed between the first and second branch passages 31a, 31b measures the pressure difference between the inlet 4a and the outlet 4b of the DPF 4. The pressure difference is exhaust gas pressure, which increases as the pressure loss at the DPF 4 increases. The pressure loss increases as the quantity of the particulate matters collected in the DPF 4 (PM collection quantity) increases.

An airflow meter 54 is disposed in the intake passage 2 for measuring the flow rate of the intake air (intake airflow rate). An accelerator position is measured based on an output signal from an accelerator position sensor 55. An engine rotation speed is measured based on an output signal from a crank angle sensor 56.

Figure 2:
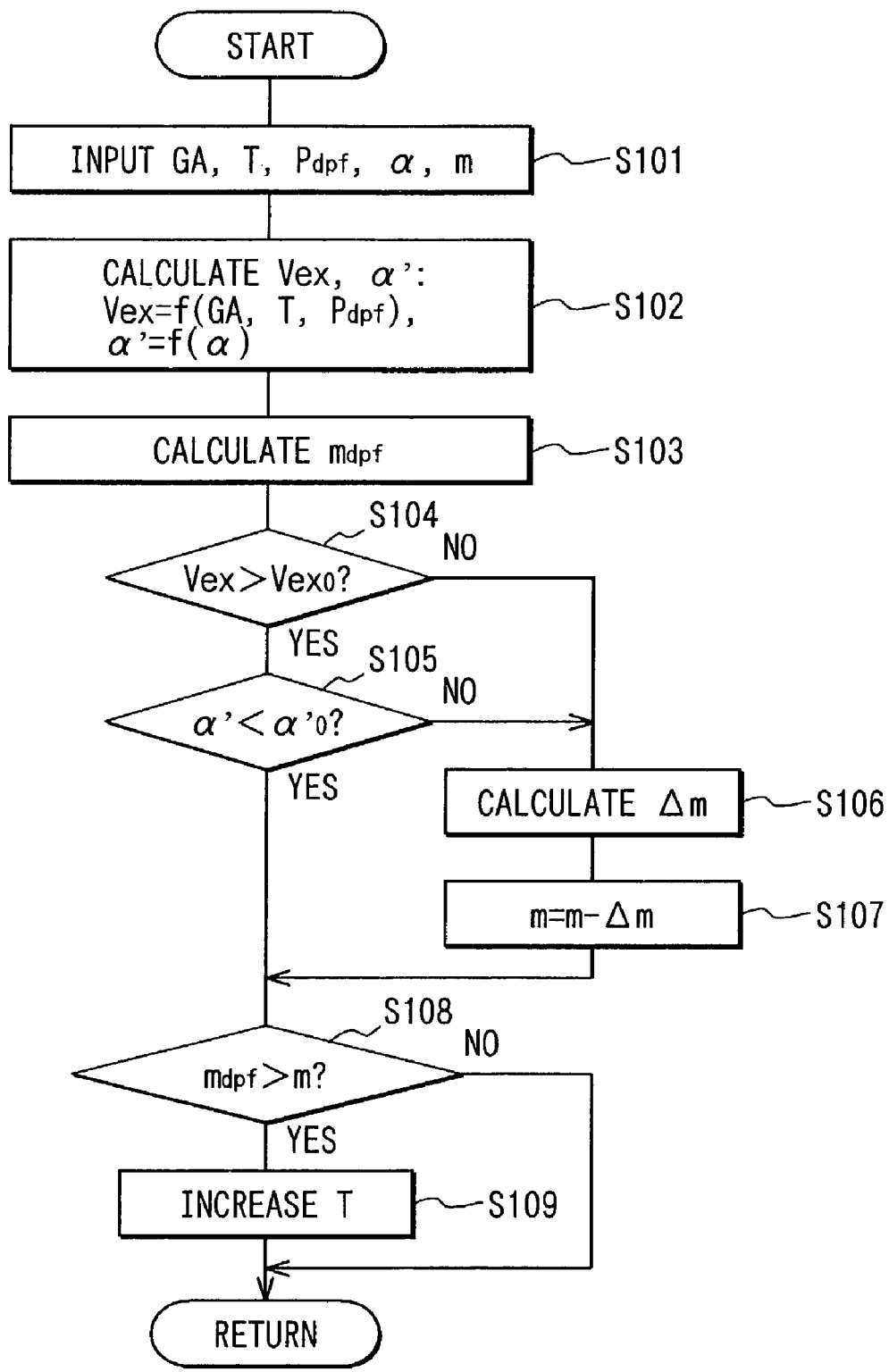
FIG. 2 is a flowchart showing control performed by an electronic control unit (ECU) of the engine according to the first embodiment.

Next, regeneration control of the DPF 4 performed by the ECU 51 will be explained based on a flowchart shown in FIG. 2. The flowchart shown in FIG. 2 is a program started at a predetermined time interval with timer interruption. First, in Step S101, the intake airflow rate GA, the DPF temperature T, the pressure difference Pdpf, the accelerator position α, and a regeneration start PM collection quantity m, at which the regeneration is started, are inputted. The intake airflow rate GA is inputted as a mass flow rate, in the embodiment.

The regeneration start PM collection quantity m is the PM collection quantity at which the regeneration of the DPF 4 should be started. The regeneration start PM collection quantity m is stored in ROM of the ECU 51 in advance. The regeneration start PM collection quantity m is set as great as possible in a permissible range in order to prevent increases in the frequency of the regeneration. For instance, the regeneration start PM collection quantity m is set at 8 grams.

Then, in Step S102, an exhaust gas flow rate Vex is calculated based on the intake airflow rate GA, the DPF temperature T and the pressure difference Pdpf. Thus, the intake airflow rate GA as the mass flow rate is converted into a volume flow rate based on the DPF temperature T and the pressure difference Pdpf. Meanwhile, a rate of change of the accelerator position α with time (an accelerator position change rate α') is calculated based on a difference between the present accelerator position α and the previous accelerator position α.

Figure 3:
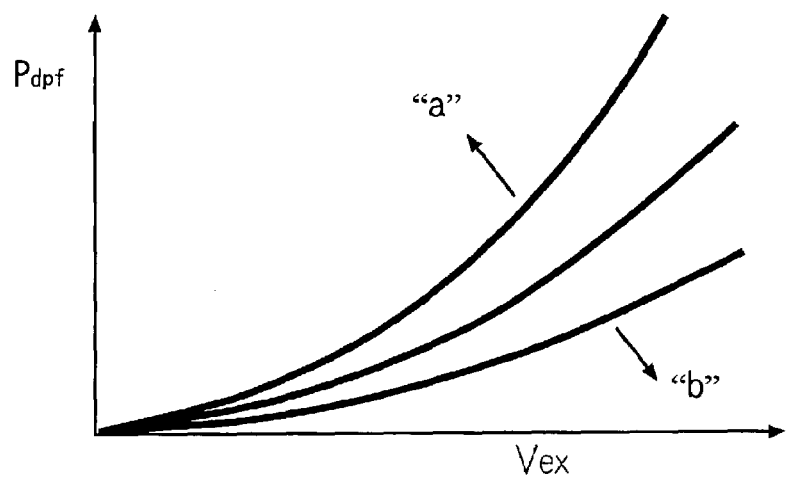
FIG. 3 is a first graph showing a content of the control performed by the ECU according to the first embodiment.

Then, in Step S103, the PM collection quantity mdpf is calculated in accordance with the exhaust gas flow rate Vex and the pressure difference Pdpf, based on a map stored in the ROM of the ECU 51. The content of the map is shown in FIG. 3. Each solid line in FIG. 3 shows a relation between the exhaust gas flow rate Vex and the pressure difference Pdpf for providing an identical PM collection quantity mdpf. If the PM collection quantity mdpf is identical, the pressure difference Pdpf decreases as the exhaust gas flow rate Vex decreases as shown in FIG. 3. The mapped data are obtained in advance through experimentation and the like. In FIG. 3, the PM collection quantity mdpf increases in a direction shown by an arrow mark "a", and decreases in another direction shown by an arrow mark "b".

Then, in Step S104, it is determined whether the exhaust gas flow rate Vex is greater than a predetermined value Vex0 or not. If the result of the determination is "YES", the processing proceeds to Step S105. In Step S105, it is determined whether the accelerator position change rate α' is less than a predetermined value α'0 or not. If the result of the determination is "YES", the processing proceeds to Step S108.

If the determination in Step S104 or S105 is negatively determined, Step S106 and Step S107 are performed, and then, the processing proceeds to Step S108. More specifically, Step S106 and Step S107 are not performed only when the exhaust gas flow rate Vex is greater than the predetermined value Vex0 and the accelerator position change rate α' is less than the predetermined value α'0.

When the exhaust gas flow rate Vex is small, the adequate pressure difference is not generated at the DPF 4. As a result, a detection error in the PM collection quantity mdpf increases. In a transitional state in which the accelerator position change rate α' changes largely, the exhaust gas flow rate Vex and the pressure difference Pdpf change largely. Accordingly, the detection error in the PM collection quantity mdpf increases as the accelerator position change rate α' increases. Therefore, when the determinations in Step S104 and Step S105 are determined affirmatively, it is determined that the detection accuracy of the PM collection quantity mdpf is adequate. When at least one of the determinations in Step S104 and Step S105 is determined negatively, it is determined that the detection accuracy of the PM collection quantity mdpf is inadequate.

Step S106 and Step S107 are performed when the detection accuracy of the PM collection quantity is inadequate. In Step S106 and Step S107, the regeneration start PM collection quantity m is corrected based on the exhaust gas flow rate Vex and the accelerator position change rate α'. The regeneration start PM collection quantity m is corrected by subtracting a predetermined decrement value Δm from a regeneration start PM collection quantity m stored in the ROM.

Figure 4:
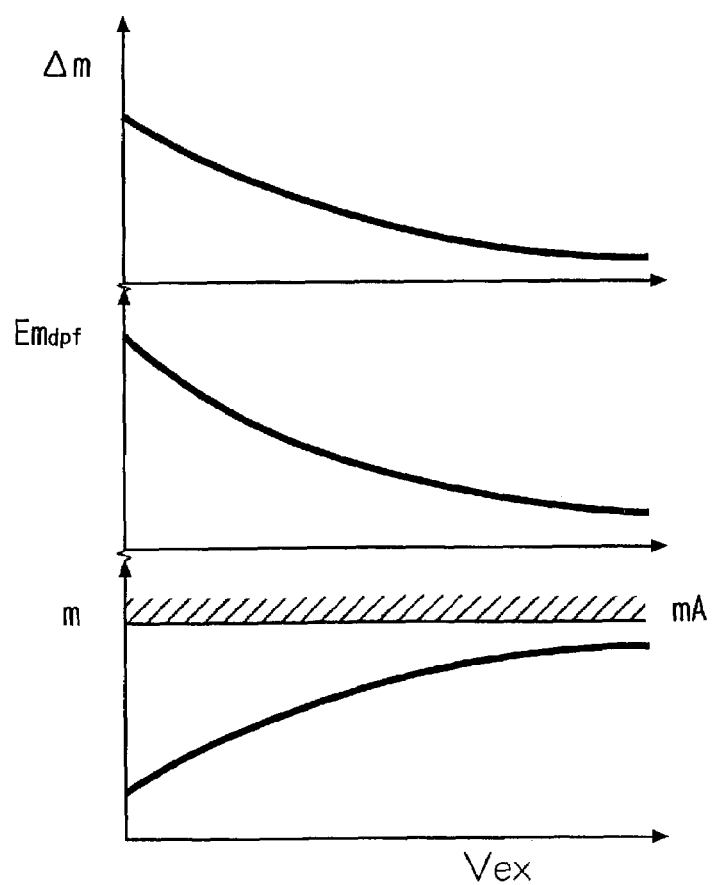
FIG. 4 is a second graph showing a content of the control performed by the ECU according to the first embodiment.
Figure 5:
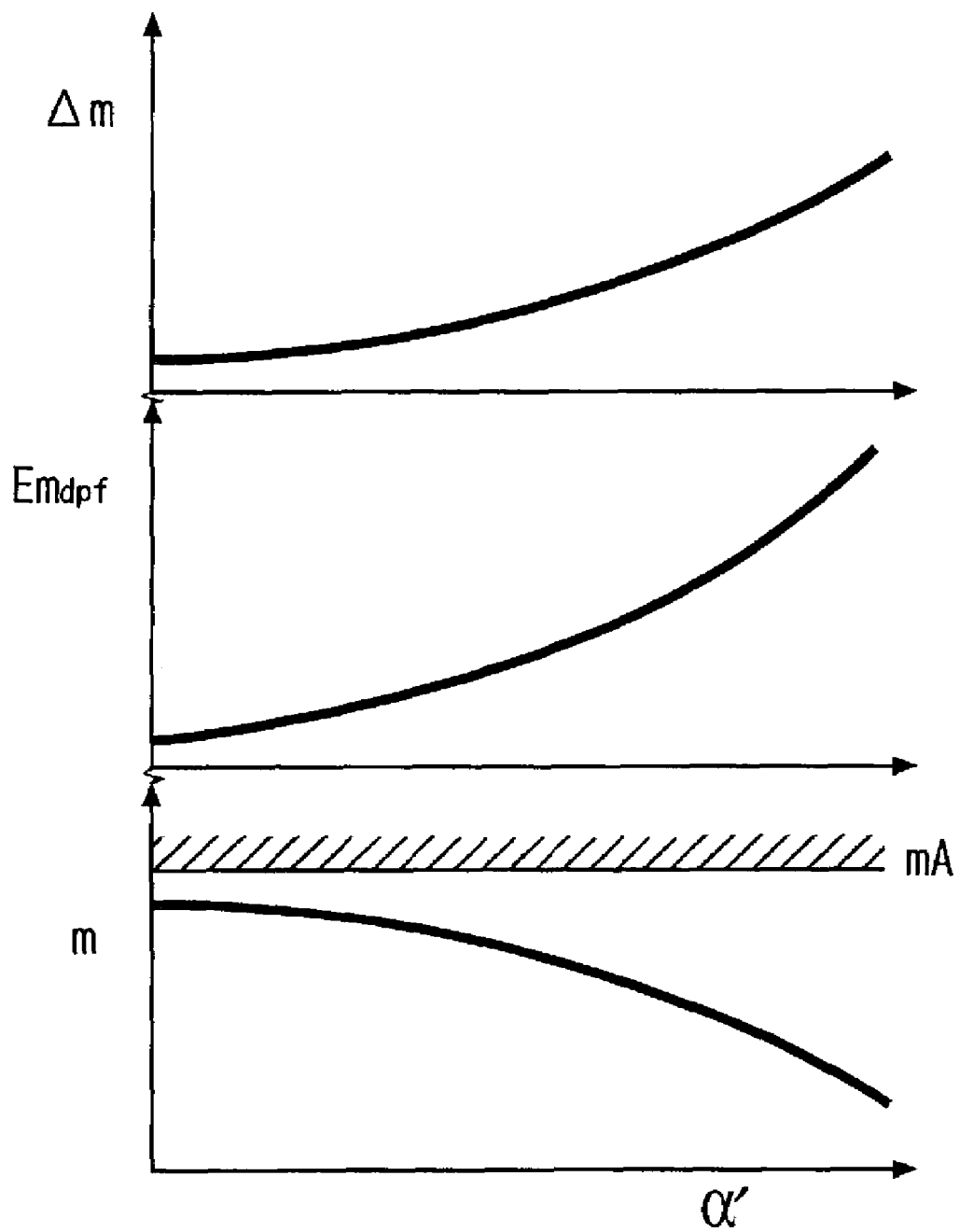
FIG. 5 is a third graph showing a content of the control performed by the ECU according to the first embodiment.

Each graph in FIG. 4 shows a relation between the exhaust gas flow rate Vex and the decrement value Δm, the PM collection quantity detection error Emdpf or the corrected regeneration start PM collection quantity m. The decrement value Δm is increased as the exhaust gas flow rate Vex decreases and the PM collection quantity detection error Emdpf increases. As the PM collection quantity detection error Emdpf increases, a margin for the corrected regeneration start PM collection quantity m relative to a permissible PM collection quantity mA, above which the regeneration is required, increases. Each graph in FIG. 5 shows a relation between the accelerator position change rate α' the decrement value Δm, the PM collection quantity detection error Emdpf or the corrected regeneration start PM collection quantity m. The decrement value Δm is increased as accelerator position change rate α' increases and the PM collection quantity detection error Emdpf increases. As the PM collection quantity detection error Emdpf increases, a margin for the corrected regeneration start PM collection quantity m relative to the permissible PM collection quantity mA increases. The ROM of the ECU 51 stores a map providing a relation between the exhaust gas flow rate Vex and the decrement value Δm, and another map providing a relation between the accelerator position change rate α' and the decrement value Δm. In Step S106, the respective components of the decrement value Δm are calculated from the maps, and the decrement value Δm is calculated by summing the components. Then, in Step S107, the decrement value Δm is subtracted from the regeneration start PM collection quantity m, which is inputted in Step S101. Thus, the corrected regeneration start PM collection quantity m is calculated.

Alternatively, the regeneration start PM collection quantity m may be corrected based on a two dimensional map in which an identical decrement value Δm is related to the exhaust gas flow rate Vex and the accelerator position change rate α', instead of using two maps.

In Step S108, it is determined whether the PM collection quantity mdpf is greater than the regeneration start PM collection quantity m or not. In the case where the exhaust gas flow rate Vex is small or the accelerator position change rate α' is large, the regeneration start PM collection quantity m is the corrected one. If the determination in Step S108 is determined affirmatively, the temperature of the DPF 4 is increased in order to regenerate the DPF 4 in Step S109. The temperature of the DPF 4 is increased by performing the post injection or by retarding the fuel injection timing. If the determination in Step S108 is determined negatively, it is determined that the quantity of the collected particulate matters has not yet reached a level at which the regeneration is required, and Step S109 is not performed.

In the first embodiment, as shown in FIGS. 4 and 5, in a state where the detection accuracy of the PM collection quantity is low, the regeneration start PM collection quantity m is corrected to a lower value. Therefore, even if the actual quantity of the collected exhaust particulate matters is greater than the detected PM collection quantity mdpf, the regeneration of the DPF 4 is performed before the actual PM collection quantity mdpf increases excessively. Thus, the damage of the DPF 4 is suitably prevented.

In addition, the decrement value Δm is provided based on the exhaust gas flow rate Vex and the accelerator position change rate α', which indicate the detection accuracy of the PM collection quantity. Therefore, if the detection accuracy of the PM collection quantity is very low, the decrement value Δm is set at a large value in order to prioritize the prevention of the damage to the DPF 4. On the other hand, if the detection accuracy of the PM collection quantity is relatively low, the decrement value Δm is set at a small value. Thus, the frequency of the regeneration is reduced, in a permissible range for preventing the damage to the DPF 4.

If the exhaust gas flow rate Vex is greater than the predetermined value Vex0 and the accelerator position change rate α' is less than the predetermined value α'0, the regeneration start PM collection quantity m is not corrected. More specifically, the regeneration start PM collection quantity is corrected under limited situations in order to alleviate load of the control. The regeneration start PM collection quantity m is corrected only when the exhaust gas flow rate Vex is equal to or less than the predetermined value Vex0 or when the accelerator position change rate α' is equal to or greater than the predetermined value α'0. In such a case, the component of the decrement value Δm corresponding to the exhaust gas flow rate Vex may not be calculated if the exhaust gas flow rate Vex is greater than the predetermined value Vex0. If the accelerator position change rate α' is less than the predetermined value α'0, the component of the decrement value Δm corresponding to the accelerator position change rate α' may not be calculated. Thus, a part of the map for the range above the predetermined value Vex0 or a part of the other map for the range below the predetermined value α'0 are not required. Thus, the control load is further alleviated.

(Second Embodiment)

Figure 6:
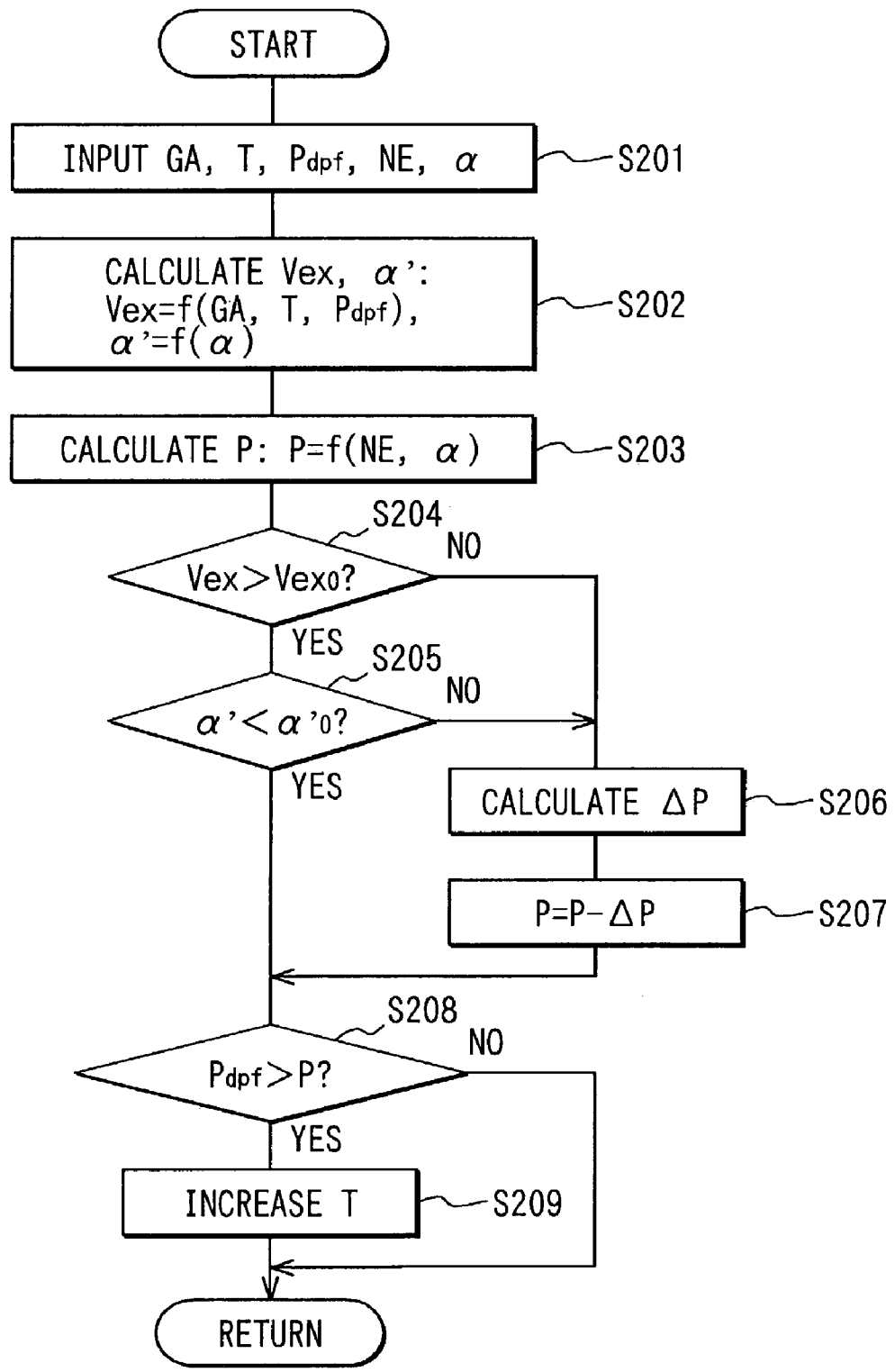
FIG. 6 is a flowchart showing control performed by an ECU of an internal combustion engine having an exhaust gas cleaning system according to a second embodiment of the present invention.

Next, control performed by an ECU of an internal combustion engine according to the second embodiment will be explained based on a flowchart shown in FIG. 6.

First, in Step S201, the intake airflow rate GA, the DPF temperature T, the pressure difference Pdpf, the engine rotation speed NE and the accelerator position α are inputted. Then, in Step S202, the exhaust gas flow rate Vex is calculated based on the intake airflow rate GA, the DPF temperature T and the pressure difference Pdpf, and the accelerator position change rate α' is calculated based on the accelerator position α, like the first embodiment.

Figure 7:
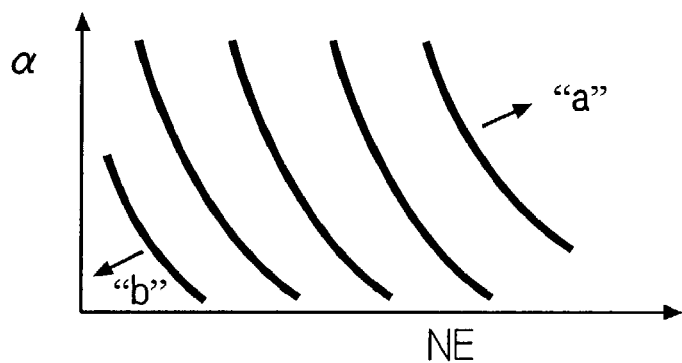
FIG. 7 is a first graph showing a content of the control performed by the ECU according to the second embodiment.

Then, in Step S203, a pressure difference at which the regeneration should be performed is calculated as a regeneration start pressure difference P based on the engine rotation speed NE and the accelerator position α. A graph in FIG. 7 shows a relation among the engine rotation speed NE, the accelerator position α and the regeneration start pressure difference P. The regeneration start pressure difference P is increased as the exhaust gas flow rate increases, that is, the regeneration start pressure difference P is increased as the engine rotation speed NE and the accelerator position α increase as shown in FIG. 7. In FIG. 7, the regeneration start pressure difference P increases in a direction shown by an arrow mark "a", and decreases in another direction shown by an arrow mark "b". The ROM of the ECU 51 stores relations between the regeneration start pressure difference P and the engine rotation speed NE or the accelerator position α. The regeneration start pressure difference P is provided based on the map.

Then, in Step S204, it is determined whether the exhaust gas flow rate Vex is greater than the predetermined value Vex0 or not, like the first embodiment. Then, in Step S205, it is determined whether the accelerator position change rate α' is less than the predetermined value α'0 or not, like the first embodiment. Thus, in accordance with the results of the determinations, it is determined whether Step S206 and Step S207 are performed or not.

The Step S206 and Step S207 are performed when the exhaust gas flow rate Vex is equal to or less than the predetermined value Vex' or when the accelerator position change rate α' is equal to or greater than the predetermined value α'0. In Step S206 and Step S207, the regeneration start pressure difference P is corrected by subtracting a pressure decrement value ΔP from the regeneration start pressure difference P calculated in Step S203, in accordance with the exhaust gas flow rate Vex and the accelerator position change rate α'.

Figure 8:
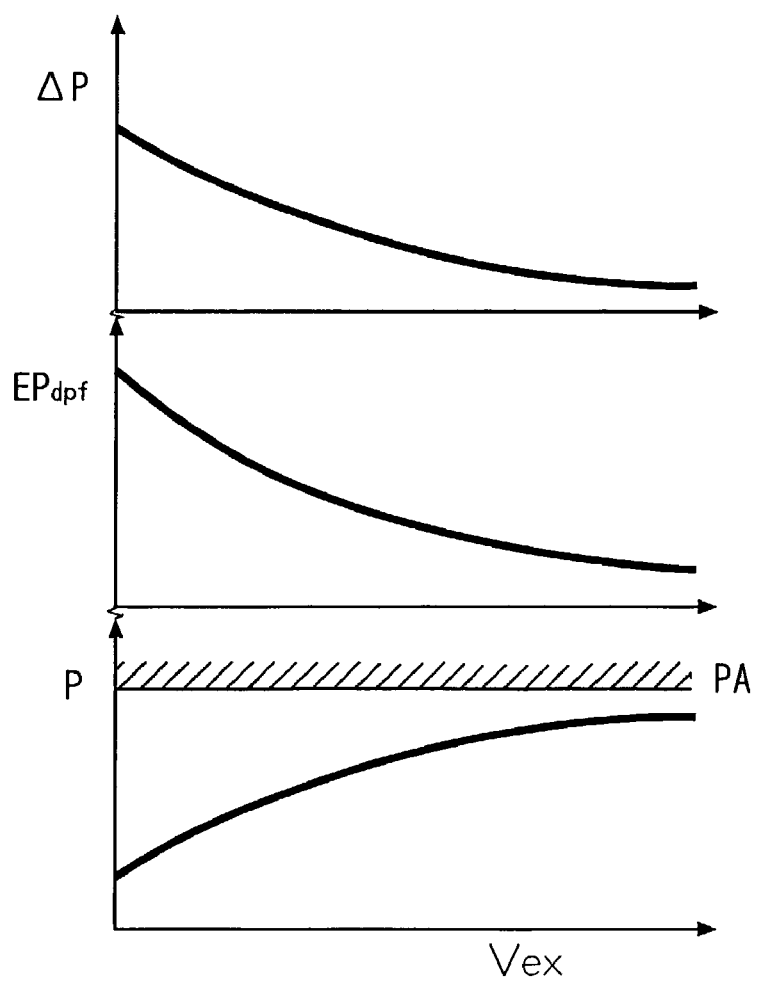
FIG. 8 is a second graph showing a content of the control performed by the ECU according to the second embodiment.
Figure 9:
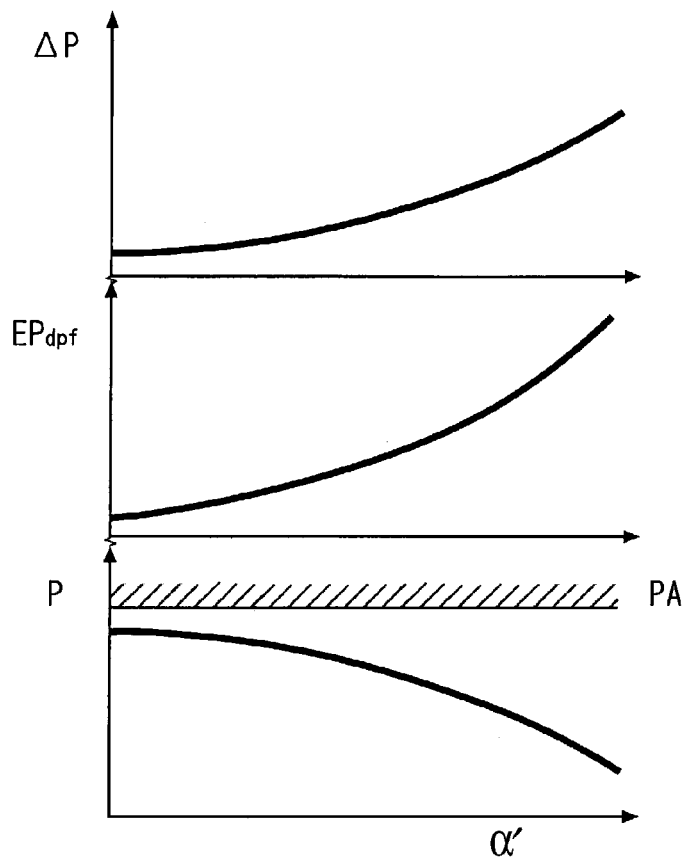
FIG. 9 is a third graph showing a content of the control performed by the ECU according to the second embodiment.

A graph in FIG. 8 shows relations between the exhaust gas flow rate Vex and the decrement value ΔP, the pressure difference detection error EPdpf or the corrected regeneration start pressure difference P. The decrement value ΔP is increased as the exhaust gas flow rate Vex is decreased and the pressure difference detection error EPdpf is increased. As the pressure difference detection error EPdpf increases, a margin for the corrected regeneration start pressure difference P relative to a permissible pressure difference PA, above which the regeneration is required, increases. A graph in FIG. 9 shows relations between the accelerator position change rate α' and the decrement value ΔP, the pressure difference detection error EPdpf or the corrected regeneration start pressure difference P. The decrement value ΔP is increased as the accelerator position change rate α' and the pressure difference detection error EPdpf increase. As the pressure difference detection error EPdpf increases, the margin for the corrected regeneration start pressure difference P relative to the permissible pressure difference PA increases. The ROM of the ECU 51 stores a map relating the exhaust gas flow rate Vex with the decrement value ΔP, and another map relating the accelerator position change rate α' with the decrement value ΔP. In Step S206, respective components of the decrement value ΔP are calculated from the maps, and the decrement value ΔP is calculated by summing the components. Then, in Step S207, the corrected regeneration start pressure difference P is calculated by subtracting the decrement value ΔP from the regeneration start pressure difference P, which is calculated in Step S203.

Then, in Step S208, it is determined whether the pressure difference Pdpf is greater than the regeneration start pressure difference P or not. In the case where the exhaust gas flow rate Vex is small, or in the case where the accelerator position change rate α' is large, the regeneration start pressure difference P is the corrected one. If the determination in Step S208 is determined affirmatively, the proceeding proceeds to Step S209. In Step S209, the temperature T of the DPF 4 is increased to regenerate the DPF 4. If the determination in Step S208 is determined negatively, it is determined that the quantity of the particulate matters has not reached a level at which the regeneration is required, and Step S209 is not performed.

In the second embodiment, the regeneration start pressure difference P is set at a low value when the detection accuracy of the pressure difference Pdpf is low. Thus, the actual PM collection value is prevented from increasing excessively. As a result, the damage to the DPF 4 during the regeneration is prevented.

(Third Embodiment)

Figure 10:
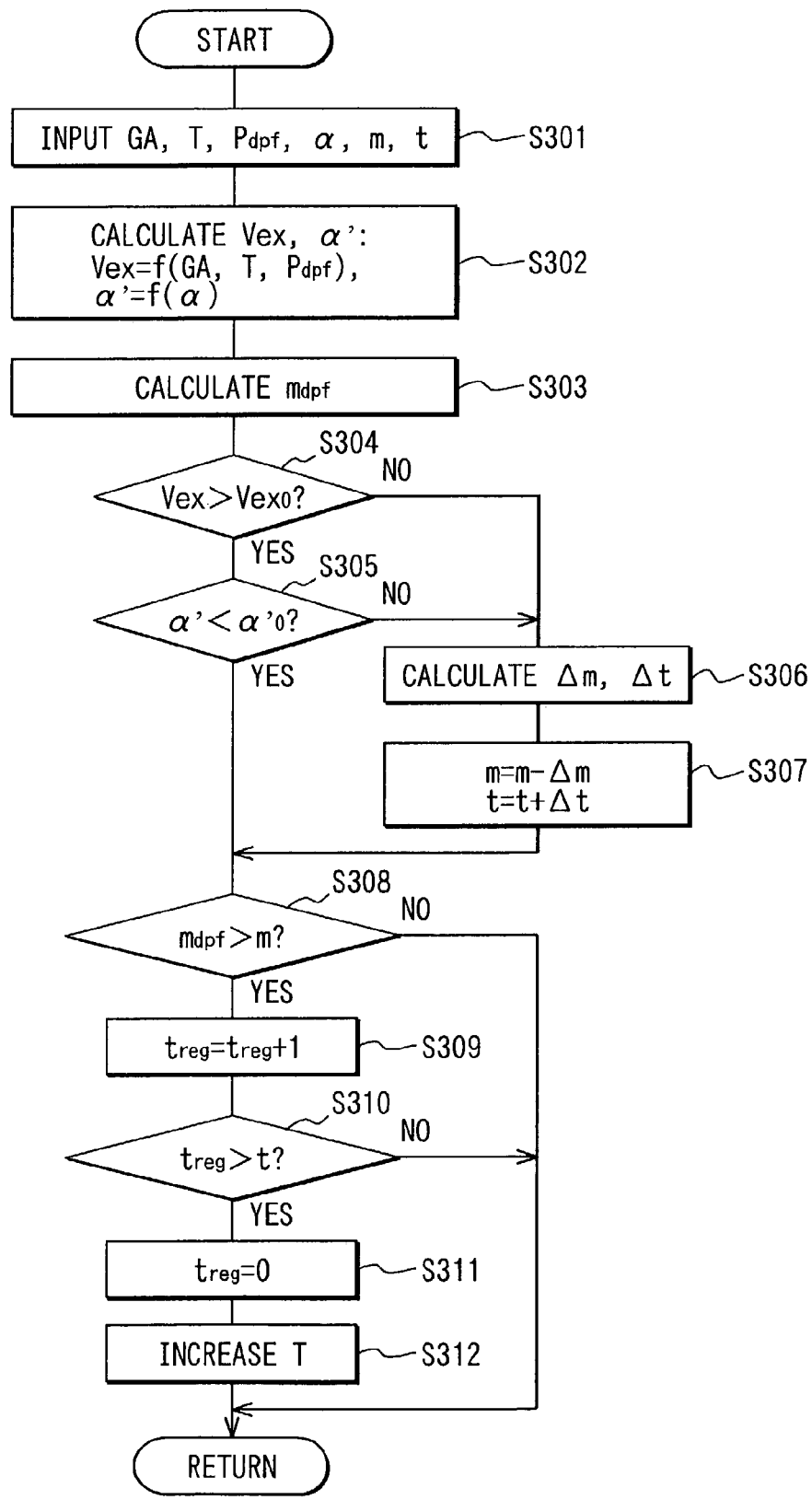
FIG. 10 is a flowchart showing control performed by an ECU of an internal combustion engine having an exhaust gas cleaning system according to a third embodiment of the present invention.

Next, control performed by an ECU of an internal combustion engine according to the third embodiment will be explained based on a flowchart shown in FIG. 10.

First, in Step S301, the intake airflow rate GA, the DPF temperature T, the pressure difference Pdpf, the accelerator position α and the regeneration start PM collection quantity m are inputted. Meanwhile, a predetermined regeneration start condition continuation period t is inputted in Step S301. The regeneration start condition continuation period t is stored in the ROM of the ECU 51 with the regeneration start PM collection quantity m. In Step S302, the exhaust gas flow rate Vex and the accelerator position change rate α' are calculated like the first embodiment. In Step S303, the PM collection quantity mdpf is calculated, like the first embodiment.

Then, in Step S304, it is determined whether the exhaust gas flow rate Vex is greater than the predetermined value Vex0 or not, like the first embodiment. Then, in Step S305, it is determined whether the accelerator position change rate α' is less than the predetermined value α'0 or not, like the first embodiment. Then, in accordance with the results of the determinations, it is determined whether Step S306 and Step S307 are performed or not.

Step S306 and Step S307 are performed when the exhaust gas flow rate Vex is less than the predetermined value Vex0 or when the accelerator position change rate α' is greater than the predetermined value α'0. In Step S306, the decrement value Δm of the regeneration start PM collection quantity m is calculated like the first embodiment, and meanwhile, an increment value Δt of the regeneration start condition continuation period t is calculated. In Step S307, the regeneration start PM collection quantity m is corrected by subtracting the decrement value Δm from the regeneration start PM collection quantity m, and meanwhile, the regeneration start condition continuation period t is corrected by adding the increment Δt to the regeneration start condition continuation period t.

The regeneration start condition continuation period t is a length of wait time for the regeneration processing. The regeneration start condition continuation period t has a length for ensuring that the PM collection quantity mdpf is continuously determined to be greater than the regeneration start PM collection quantity m for a sufficient period. For instance, if the determination that the PM collection quantity mdpf is greater than the regeneration start PM collection quantity m continues for the regeneration start condition continuation period t, the regeneration is performed. Therefore, in the case where the regeneration start condition continuation period t is long enough, the determination to start the regeneration is further ensured even if the detection accuracy of the PM collection quantity is low. However, if the regeneration start condition continuation period t is too long, the regeneration cannot be started at appropriate timing. On the other hand, if the regeneration start condition continuation period t is too short, the frequency of the regeneration is increased unnecessarily. Therefore, the regeneration start condition continuation period t is corrected in consideration with the detection accuracy of the PM collection quantity as follows.

Figure 11:
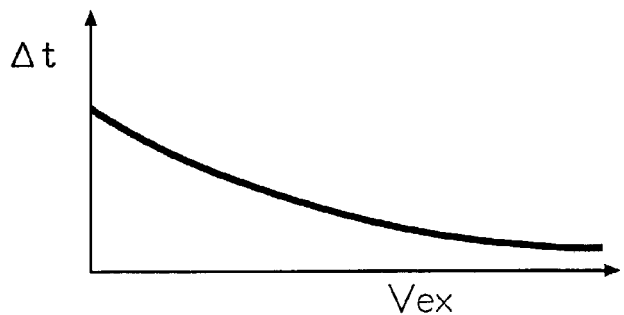
FIG. 11 is a first graph showing a content of the control performed by the ECU according to the third embodiment.
Figure 12:
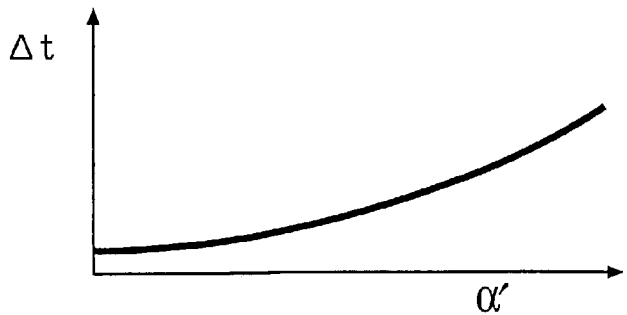
FIG. 12 is a second graph showing a content of the control performed by the ECU according to the third embodiment.

A graph in FIG. 11 shows a relation between the exhaust gas flow rate Vex and the increment value Δt, which is decreased as the exhaust gas flow rate Vex increases. A graph in FIG. 12 shows a relation between the accelerator position change rate α' and the increment value Δt, which is increased as the accelerator position change rate α' increases. The ROM of the ECU 51 stores a map relating the exhaust gas flow rate Vex with the increment value Δt, and another map relating the accelerator position change rate α' with the increment value Δt. In Step S306, components of the increment value Δt are calculated from the maps, and the increment value Δt is calculated by summing the components. Then, in Step S307, the corrected regeneration start condition continuation period t is calculated by adding the increment value Δt to the regeneration start condition continuation period t, which is stored in the ROM.

Then, in Step S308, it is determined whether the PM collection quantity mdpf is greater than the regeneration start collection quantity m or not, if the result of the determination in Step S308 is "NO", it is determined that the quantity of the particulate matters collected in the DPF 4 has not reached the level at which the regeneration is required. Then, the processing proceeds to the return (RETURN), skipping steps from Step S309 to Step S312.

If the determination in Step S308 is determined affirmatively, regeneration wait time "treg" is incremented in Step S309, and the processing proceeds to Step S310. In Step S310, it is determined whether the regeneration wait time treg is longer than the regeneration start condition continuation period t or not. If the result of the determination in Step S310 is "NO", the processing proceeds to the return (RETURN).

If the result of the determination in Step S310 is "YES", the regeneration wait time treg is reset (treg=0) in Step S311, and then, the temperature T of the DPF 4 is increased to regenerate the DPF 4 in Step S312.

Thus, the regeneration processing of the DPF 4 is performed if a total period, in which the PM collection quantity mdpf is greater than the regeneration start PM collection quantity m, reaches the regeneration start condition continuation period t.

Thus, the regeneration of the DPF 4 is performed after the PM collection quantity mdpf is determined to be greater than the regeneration start PM collection quantity m continuously for at least a predetermined period. Thus, the necessity of the regeneration processing can be determined more appropriately, even if the detection accuracy of the PM collection quantity mdpf is low. Even if the PM collection quantity mdpf becomes less than the regeneration start PM collection quantity m suddenly and temporarily in Step S308 after the PM collection quantity mdpf exceeds the regeneration start PM collection quantity m, the regeneration wait period treg at that time is maintained, and the processing proceeds to the return. Therefore, even if the PM collection quantity mdpf becomes less than the regeneration start PM collection quantity m due to a noise-like factor, the determination of the necessity of the regeneration is not affected, providing a high practicability.

In addition, the regeneration start condition continuation period t is set longer as the detection accuracy of the PM collection quantity decreases. Thus, the determination of the necessity of the regeneration is further assured.

(Fourth Embodiment)

Figure 13:
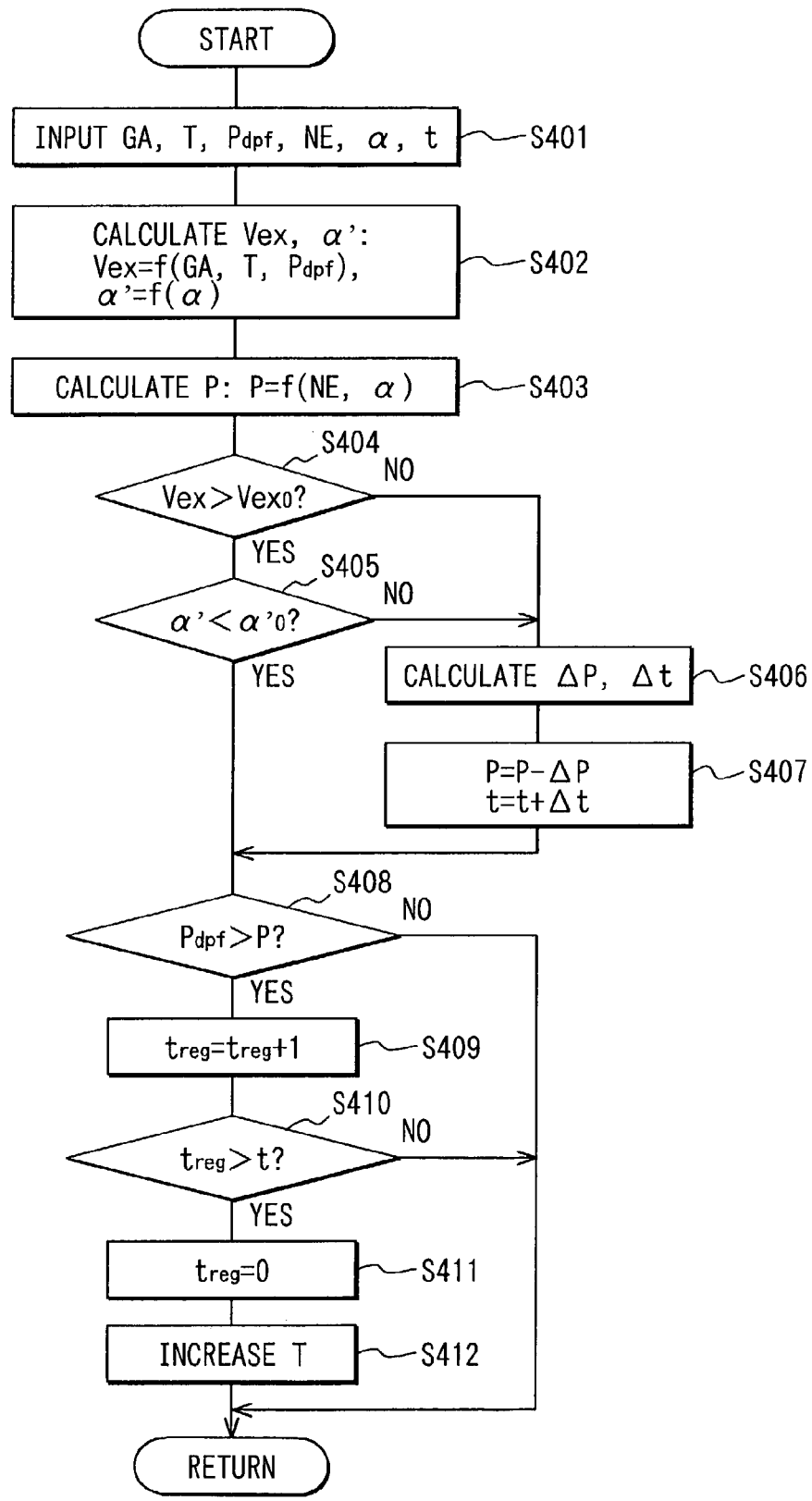
FIG. 13 is a flowchart showing control performed by an ECU of an internal combustion engine having an exhaust gas cleaning system according to a fourth embodiment of the present invention.

Next, control performed by an ECU of an internal combustion engine according to the fourth embodiment will be explained based on a flowchart shown in FIG. 13.

First, in Step S401, the intake airflow rate GA, the DPF temperature T, the pressure difference Pdpf, the rotation speed NE, and the accelerator position α are inputted like the second embodiment. In addition, the regeneration start condition continuation period t is inputted in Step S401. Then, the exhaust gas flow rate Vex and the accelerator position change rate α' are calculated in Step S402 like the second embodiment. Then, the regeneration start pressure difference P is calculated in Step S403.

Then, in Step S404, it is determined whether the exhaust gas flow rate Vex is greater than the predetermined value Vex0 or not like the first embodiment. Then, in Step S405, it is determined whether the accelerator position change rate α' is less than the predetermined value α'0 or not, like the first embodiment. Thus, in accordance with the results of the determinations, it is determined whether Step S406 and Step S407 are performed or not.

Step S406 and Step S407 are performed when the exhaust gas flow rate Vex is equal to or less than the predetermined value Vex0 or when the accelerator position change rate α' is equal to or greater than the predetermined value α'0. In Step S406, like the second embodiment, the decrement value ΔP of the regeneration start pressure difference P is calculated, and meanwhile, the increment value Δt of the regeneration start condition continuation period t is calculated. In Step S407, the regeneration start pressure difference P is corrected by subtracting the decrement value ΔP from the regeneration start pressure difference P like the second embodiment, and meanwhile, the regeneration start condition continuation period t is corrected by adding the increment value Δt to the regeneration start condition continuation period t.

The regeneration start condition continuation period t is a length of wait time of the regeneration processing. The regeneration start condition continuation period t has a length for ensuring that the pressure difference Pdpf is continuously determined to be greater than the regeneration start pressure difference P for a sufficient period. The regeneration start condition continuation period t is corrected in accordance with the detection accuracy of the pressure difference Pdpf.

The increment value Δt is increased as the exhaust gas flow rate Vex decreases and the accelerator position change rate α' increases.

Then, in Step S408, it is determined whether the pressure difference Pdpf is greater than the regeneration start pressure difference P or not. If the result of the determination in Step S408 is "NO", it is determined that the quantity of the particulate matters collected by the DPF 4 has not reached a level at which the regeneration is required, and the processing proceeds to the return, skipping the steps from Step S409 to Step S412.

If the determination in Step S408 is determined affirmatively, the regeneration wait time "treg" is incremented in Step S409, and the processing proceeds to Step S410. In Step S410, it is determined whether the regeneration wait time treg is greater than the regeneration condition continuation period t or not. If the result of the determination in Step S410 is "NO", the processing proceeds to the return.

If the determination in Step S410 is determined affirmatively, the regeneration wait time treg is reset (treg=0) in Step S411. Then, in Step S412, the temperature T of the DPF 4 is increased to regenerate the DPF 4.

Thus, the regeneration processing of the DPF 4 is performed if a total period, in which the pressure difference Pdpf is greater than the regeneration start pressure difference P, reaches the regeneration start condition continuation period t.

Thus, the regeneration of the DPF 4 is performed after the pressure difference Pdpf is determined to be greater than the regeneration start pressure difference P continuously for at least a predetermined period. Thus, the necessity of the regeneration can be determined more appropriately, even if the detection accuracy of the pressure difference Pdpf is low. Even if the pressure difference Pdpf becomes less than the regeneration start pressure difference P suddenly and temporarily in Step S408 after the pressure difference Pdpf exceeds the regeneration start pressure difference P, the regeneration wait period treg at that time is maintained, and the processing proceeds to the return. Therefore, even if the pressure difference Pdpf becomes less than the regeneration start pressure difference P due to a noise-like factor, the determination of the necessity of the regeneration is not affected, providing a high practicability.

In addition, the regeneration start condition continuation period t is increased as the detection accuracy of the pressure difference Pdpf decreases. Thus, the determination of the necessity of the regeneration is further assured.

(Fifth Embodiment)

Figure 14:
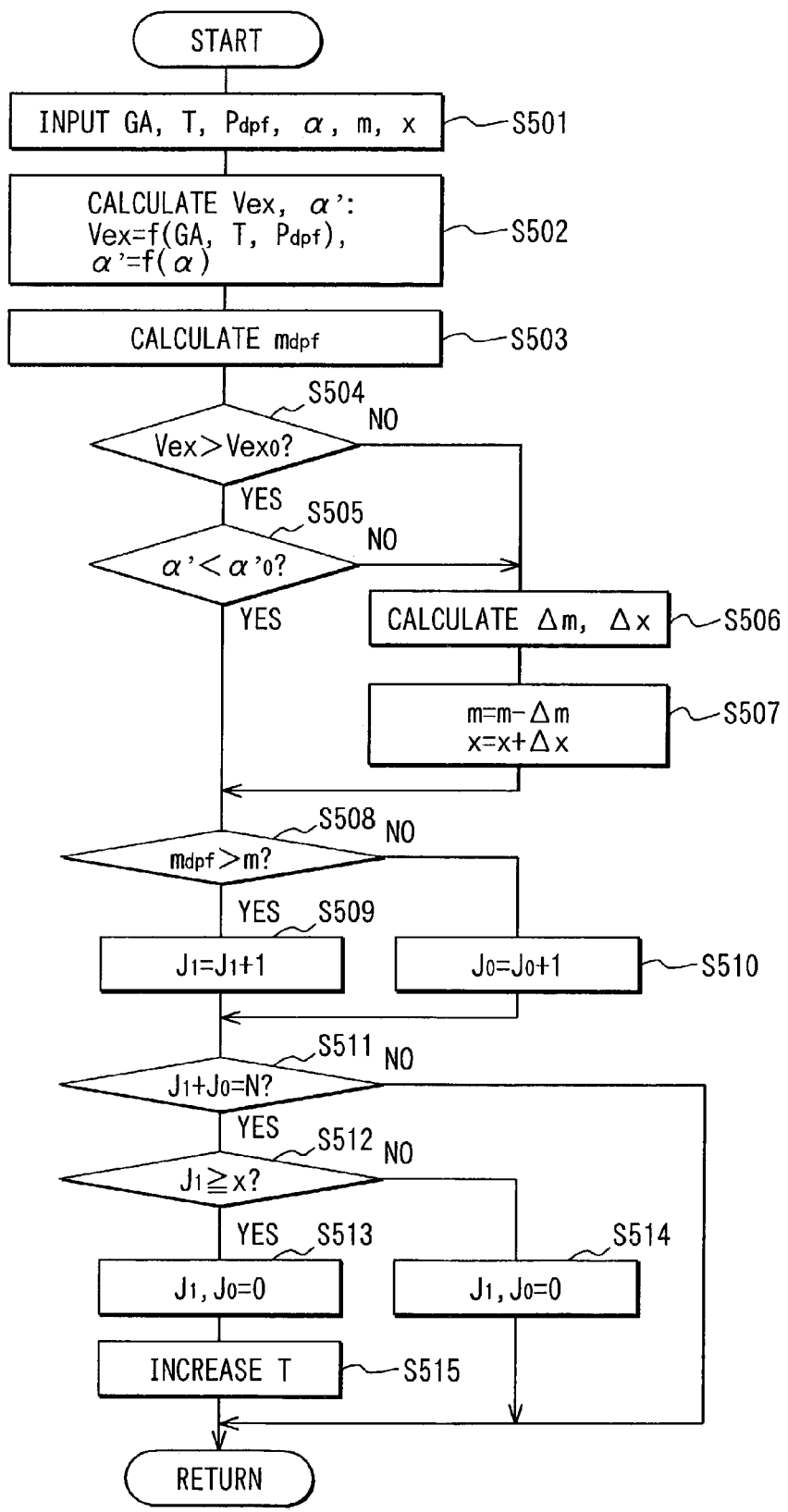
FIG. 14 is a flowchart showing control performed by an ECU of an internal combustion engine having an exhaust gas cleaning system according to a fifth embodiment of the present invention.

Next, control performed by an ECU of an internal combustion engine according to the fifth embodiment will be explained based on a flowchart shown in FIG. 14.

First, in Step S501, the intake airflow rate GA, the DPF temperature T, the pressure difference Pdpf, the accelerator position α, and the regeneration start PM collection quantity m are inputted like the first embodiment. In addition, in Step S501, a regeneration start condition formation frequency x is inputted. The regeneration start condition formation frequency x is stored in the ROM of the ECU 51. Then, the exhaust gas flow rate Vex and the accelerator position change rate α' are calculated in Step S502 like the first embodiment. Then, in Step S503, the PM collection quantity mdpf is calculated in Step S503 like the first embodiment.

Then, in Step S504, it is determined whether the exhaust gas flow rate Vex is greater than a predetermined value Vex0 or not, like the first embodiment. Then, in Step S505, it is determined whether the accelerator position change rate α' is less than the predetermined value α'0 or not, like the first embodiment. In accordance with the results of the determinations, it is determined whether Step S506 and S507 are performed or not.

Figure 15:
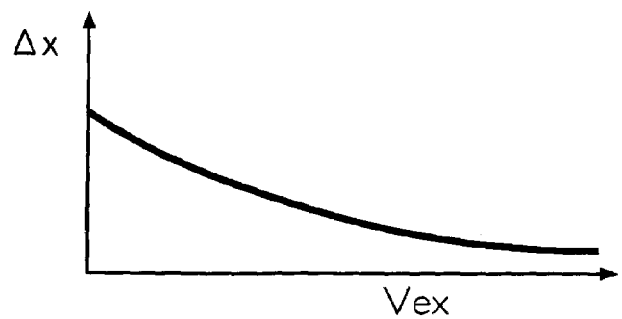
FIG. 15 is a first graph showing a content of the control performed by the ECU according to the fifth embodiment.
Figure 16:
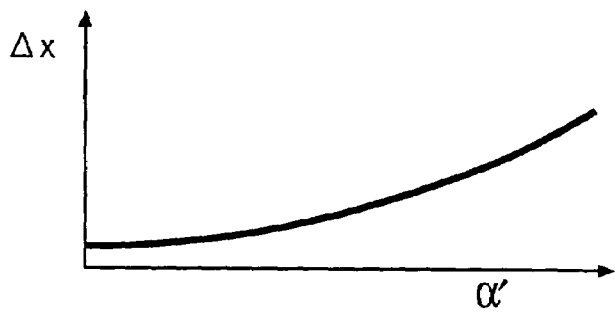
FIG. 16 is a second graph showing a content of the control performed by the ECU according to the fifth embodiment.

If the exhaust gas flow rate Vex is less than the predetermined value Vex0 or if the accelerator position change rate α' is greater than the predetermined value α'0, Step S506 and Step S507 are performed. In Step S506, the decrement value Δm for the regeneration start PM collection quantity m is calculated like the first embodiment. Meanwhile, in Step S506, an increment value Δx for the regeneration start condition formation frequency x is calculated. Then, in Step S507, the regeneration start PM collection quantity m is corrected by subtracting the decrement value Δm from the regeneration start PM collection quantity m. Meanwhile, in Step S507, the regeneration start condition formation frequency x is corrected by adding the increment value Δx to the regeneration start condition formation frequency x. A graph in FIG. 15 shows a relation between the exhaust gas flow rate Vex and the increment value Δx, which is increased as the exhaust gas flow rate Vex decreases. A graph in FIG. 16 shows a relation between the accelerator position change rate α' and the increment value Δx, which is increased as the accelerator position change rate α' increases. The ROM of the ECU 51 stores a map relating the exhaust gas flow rate Vex with the increment value Δx, and another map relating the accelerator position change rate α' with the increment value Δx. The maps are read in Step S506.

Then, in Step S508, it is determined whether the PM collection quantity mdpf is greater than the regeneration start PM collection quantity m or not.

If the result of the determination in Step S508 is "YES", a frequency J1 is incremented (J1=J1+1) in Step S509, then the processing proceeds to Step S511. If the result of the determination in Step S510 is "NO", a frequency J0 is incremented (J0=J0+1) in Step S510, and the processing proceeds to Step S511.

In Step S511, it is determined whether a sum of the frequency J1 and the frequency J0 (J1+J0) has reached a predetermined number N or not. If the result of the determination in Step S511 is "NO", the processing proceeds to the return, skipping steps from Step S512 to Step S516.

If the determination in Step S511 is determined affirmatively, it is determined whether the frequency J1 is "equal to or greater than" the regeneration start condition formation frequency x or not in Step S512. If the result of the determination in Step S512 is "YES", the frequencies J1, J0 are reset in Step S513. Then, the regeneration processing of the DPF 4 is performed in Step S515. If the result of the determination in Step S512 is "NO", the frequencies J1, J0 are reset in Step S514, and it is determined that the quantity of the collected particulate matters has not reached the level at which the regeneration of the DPF 4 is required. Then, the processing proceeds to the return, skipping Step S515.

Thus, the necessity of the regeneration processing of the DPF 4 is determined appropriately in the fifth embodiment also. Furthermore, the necessity of the regeneration processing is determined more appropriately, compared with the third embodiment. That is, there is a possibility that the PM collection quantity mdpf exceeds the regeneration start PM collection quantity m suddenly and temporarily due to noise-like causes, even when the actual quantity of the collected particulate matters has not reached the level at which the regeneration is required. If such a situation occurs sporadically at a certain time interval and the frequency of the situation accumulates, the regeneration wait time treg will exceed the regeneration start condition continuation period t. As a result, the regeneration will be performed even before the regeneration is actually required. Therefore, in the fifth embodiment, the regeneration processing is not performed until the frequency J1 exceeds the regeneration start condition formation number x. The frequency J1 is the frequency for the PM collection quantity mdpf to exceed the regeneration start PM collection quantity m. More specifically, the regeneration processing is not performed until the ratio of the frequency J1 relative to the number N exceeds a predetermined ratio. Therefore, even if the PM collection quantity mdpf suddenly and temporarily exceeds the regeneration start PM collection quantity m, it will not cause the erroneous regeneration afterward.

(Sixth Embodiment)

Figure 17:
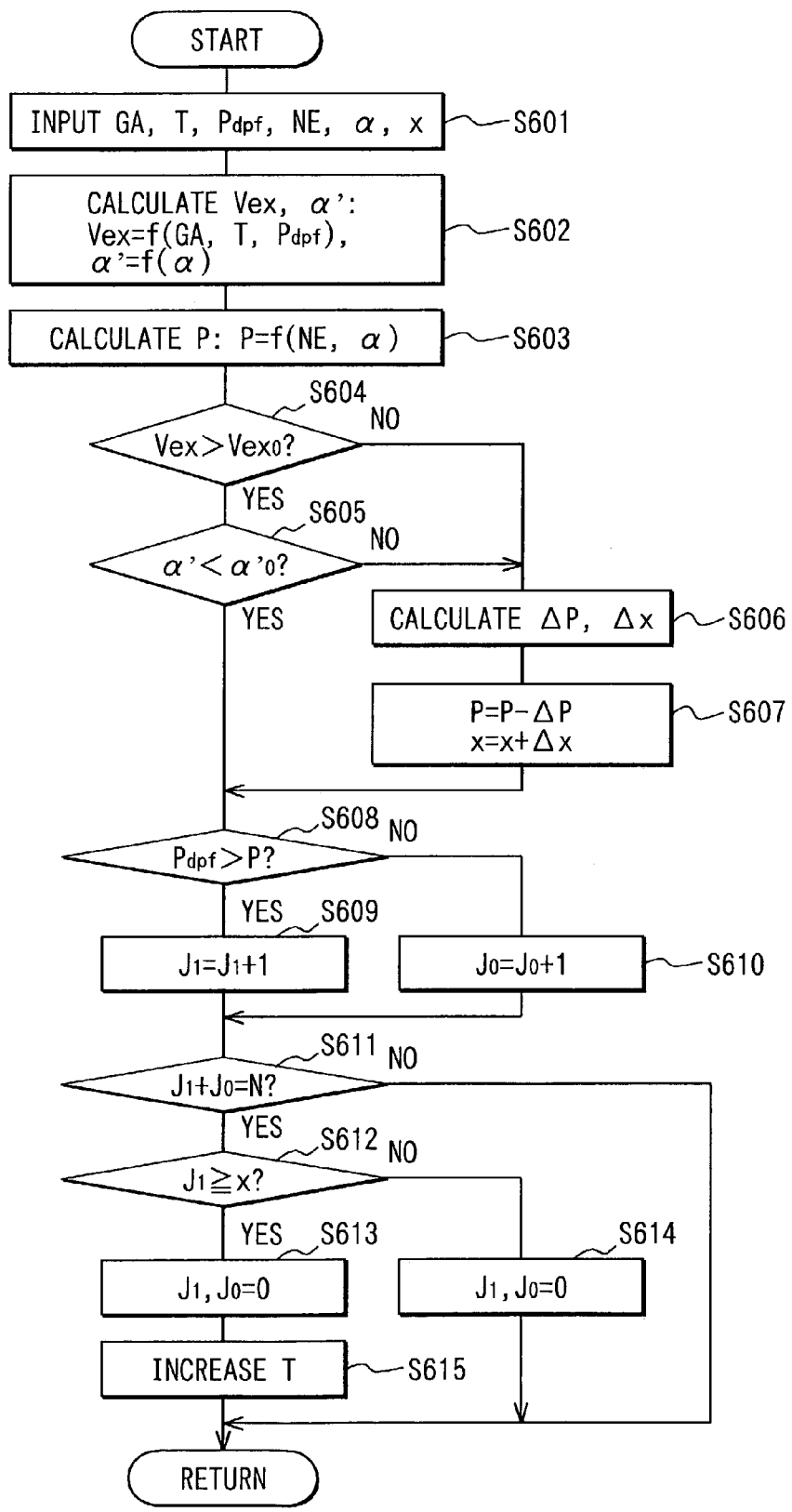
FIG. 17 is a flowchart showing control performed by an ECU of an internal combustion engine having an exhaust gas cleaning system according to a sixth embodiment of the present invention.

Next, control performed by an ECU of an internal combustion engine according to the sixth embodiment will be explained based on a flowchart shown in FIG. 17.

First, in Step S601, the intake airflow rate GA, the DPF temperature T, the pressure difference Pdpf and the accelerator position α are inputted like the second embodiment. In addition, in Step S601, the regeneration start condition formation frequency x is inputted. Then, in Step S602, the exhaust gas flow rate Vex and the accelerator position change rate α' are calculated like the second embodiment. Then, in Step S603, the regeneration start pressure difference P is calculated like the second embodiment.

Then, in Step S604, it is determined whether the exhaust gas flow rate Vex is greater than the predetermined value Vex0 or not, like the first embodiment. Then, in Step S605, it is determined whether the accelerator position change rate α' is less than the predetermined value α'0 or not, like the first embodiment. In accordance with the results of the determinations, it is determined whether Step S606 and Step S607 are performed or not.

Step S606 and Step S607 are performed when the exhaust gas flow rate Vex is less than the predetermined value Vex' or when the accelerator position change rate α' is greater than the predetermined value α'0. In Step S606, the decrement value ΔP for the regeneration start pressure difference P is calculated like the second embodiment. Meanwhile, in Step S606, the increment value Δx for the regeneration start condition formation frequency x is calculated. Then, in Step S607, the regeneration start pressure difference P is corrected by subtracting the decrement value ΔP from the regeneration start pressure difference P, and the regeneration start condition formation frequency x is corrected by adding the increment value Δx to the regeneration start condition formation frequency x.

Then, in Step S608, it is determined whether the pressure difference Pdpf is greater than the regeneration start pressure difference P or not.

If the result of the determination in Step S608 is "YES", a frequency J1 is incremented in Step S609 (J1=J1+1), and the processing proceeds to Step S611. If the result of the determination in Step S608 is "NO", another frequency J0 is incremented in Step S611 (J0=J0+1), and the processing proceeds to Step S611.

In Step S611, it is determined whether the sum of the frequencies J1, J0 (J1+J0) has reached a predetermined value N or not. If the result of the determination in Step S611 is "NO", the processing proceeds to the return, skipping the steps from Step S612 to Step S615.

If the result of the determination in Step S611 is "YES", it is determined whether the frequency J1 is "equal to or greater than" the regeneration start condition formation frequency x or not in Step S612. If the result of the determination in Step S612 is "YES", the frequencies J1, J0 are reset in Step S613. Then, the regeneration processing of the DPF 4 is performed in Step S615. If the result of the determination in Step S612 is "NO", the frequencies J1, J0 are reset in Step S614 and it is determined that the quantity of the collected particulate matters has not reached a level at which the regeneration is required. Then, the processing proceeds to the return, skipping Step S615.

Thus, the necessity of the regeneration processing of the DPF 4 can be determined appropriately in the sixth embodiment also. Furthermore, the necessity of the regeneration processing can be determined more appropriately, compared with the fourth embodiment. That is, there is a possibility that the pressure difference Pdpf exceeds the regeneration start pressure difference P suddenly and temporarily due to noise-like causes, even when the actual quantity of the collected particulate matters has not reached the level at which the regeneration is required. If such a situation occurs sporadically at a certain time interval and the frequency of the situation accumulates, the regeneration wait time treg will exceed the regeneration start condition continuation period t. As a result, the regeneration will be performed even before the regeneration is actually required. Therefore, in the sixth embodiment, the regeneration is not performed until the frequency J1 exceeds the regeneration start condition formation number x. The frequency J1 is the frequency for the pressure difference Pdpf to exceed the regeneration start pressure difference P during N times comparison between the pressure difference Pdpf and the regeneration start pressure difference P. More specifically, the regeneration is not performed until the ratio of the frequency J1 relative to the number N exceeds a predetermined ratio. Therefore, even if the pressure difference Pdpf suddenly and temporarily exceeds the regeneration start pressure difference P, it will not cause the erroneous regeneration afterward.

(Modifications)

In the fifth and sixth embodiments, the frequency J1 is compared with the regeneration start condition formation frequency x once while the PM collection quantity mdpf or the pressure difference Pdpf is detected N times. Alternatively, the result of the binary determination of comparison between the PM collection quantity mdpf and the regeneration start PM collection quantity m may be stored in a value "1", or "0". More specifically, when the PM collection quantity mdpf is determined to be greater than the regeneration start PM collection quantity, a value "1" is stored. When the PM collection quantity mdpf is determined to be equal to or less than the regeneration start PM collection quantity, a value "0" is stored. When a number of the stored values becomes N, the frequency J1 is compared with the regeneration start condition formation frequency x. In this case, the frequency J1 is a number of the stored values "1". In the next binary determination, the first value in the N values "0" or "1" is replaced with a new value. Then, based on the renewed N values, it is determined whether the frequency J1 is "equal to or greater than" the regeneration start condition formation frequency x or not. Thus, once the number of the result of the binary determination becomes N, it is determined whether the frequency J1 is equal to or greater than the regeneration start condition formation frequency x, every time the binary determination is performed.

Figure 18:
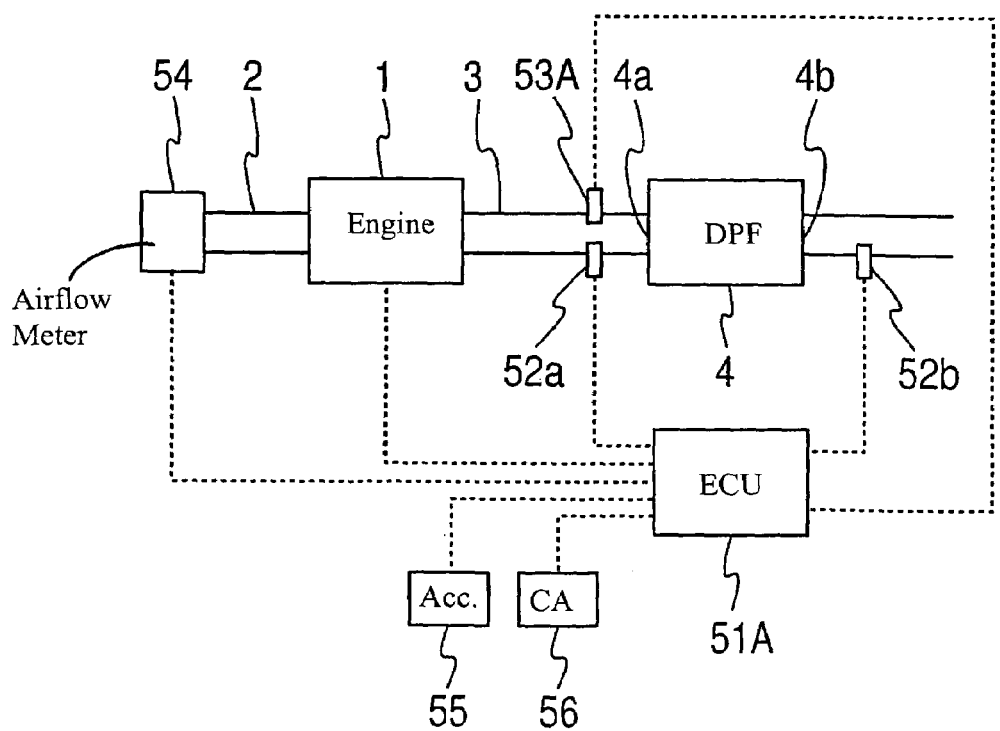
FIG. 18 is an internal combustion engine having an exhaust gas cleaning system according to a seventh embodiment of the present invention.

In the above embodiments, the PM collection quantity mdpf is calculated based on the pressure difference Pdpf, and the necessity of the regeneration is determined based on the pressure difference Pdpf. Alternatively, the PM collection quantity mdpf may be calculated based on a pressure of the exhaust gas passing through the exhaust pipe, which is measured by a pressure sensor 53A and an ECU 51A. The pressure sensor 53A is disposed just upstream of the DPF 4 as shown in FIG. 18. Likewise, the necessity of the regeneration may be determined based on the pressure measured by the pressure sensor 53A and an ECU 51A. It is because the pressure just downstream of the DPF 4 is a sum of the atmospheric pressure and the pressure loss generated in a catalyst or a muffler disposed downstream of the DPF 4, and can be considered to be constant in a certain required accuracy. In this case, the pressure loss is obtained in advance. Preferably, a relation between the pressure loss and the pressure of the exhaust gas just upstream of the DPF 4 should be obtained in advance, in view of accuracy.

In the above embodiments, the adequacy of the detection accuracy of the PM collection quantity mdpf or the pressure difference Pdpf is determined based on the exhaust gas flow rate Vex and the accelerator position change rate $\alpha'$. If the detection accuracy is determined to be adequate, the correction of the regeneration start PM collection quantity m or the regeneration start pressure difference P is not performed. Alternatively, the regeneration start PM collection quantity m or the regeneration start pressure difference P may be corrected regardless of the exhaust gas flow rate Vex or the accelerator position change rate $\alpha'$.

In the correction of the regeneration start PM collection quantity m or the regeneration start pressure difference P, the increment value $\Delta m$, $\Delta P$ may be provided in accordance with either the exhaust gas flow rate Vex or the accelerator position change rate $\alpha'$.

As the reference of the detection accuracy of the PM collection quantity mdpf or the pressure difference Pdpf, a rate of change in the engine rotation speed or a rate of change in vehicle velocity may be employed, in addition to the accelerator position change rate $\alpha'$.

In the embodiments, the regeneration start pressure difference P is calculated based on the engine rotation speed NE and the accelerator position $\alpha$. Alternatively, the fuel injection quantity or output torque may be employed instead of the accelerator position $\alpha$.

The present invention should not be limited to the disclosed embodiments, but may be implemented in many other ways without departing from the spirit of the invention.

What is claimed is:

1. A method of cleaning exhaust gas of an internal combustion engine having a particulate filter, which is disposed in an exhaust passage for collecting exhaust particulate matters included in exhaust gas discharged from cylinders of an engine main body and is regenerated at predetermined timing by eliminating the collected exhaust particulate matters, the method comprising:

detecting an operating state of the engine;

calculating a collecting state parameter, which increases as a quantity of the collected exhaust particulate matters increases, based on the detected operating state;

calculating a detection accuracy determination value as a reference of detection accuracy of the collecting state parameter based on the detected operating state;

resetting a regeneration start value so that the regeneration start value is decreased as the detection accuracy decreases, in accordance with the detection accuracy determination value;

determining whether the collecting state parameter is greater than the regeneration start value or not; and starting the regeneration of the particulate filter if the collecting state parameter is determined to be greater than the regeneration start value;

wherein resetting the regeneration start value includes correcting the regeneration start value by a correction value, which is calculated based on a pre-stored correspondence between the detection accuracy determination value and the correction value, and determining whether the detection accuracy is higher than a threshold detection accuracy or not by comparing the detection accuracy determination value with a threshold value, and for prohibiting the correction of the regeneration start value if the detection accuracy is determined to be higher than the threshold detection accuracy.

2. The method as in claim 1, wherein:
the collecting state parameter is the quantity of the collected exhaust particulate matters, which is calculated based on the detected operating state, and
the regeneration start value is a given value of the quantity of the collected exhaust particulate matters, the given value being stored in the system in advance.

3. The method as in claim 1, wherein:
the collecting state parameter is pressure of the exhaust gas passing through the particulate filter, and
the regeneration start value is a given value of the pressure of the exhaust gas, the given value being calculated based on the operating state of the engine.

4. The method as in claim 1, wherein the detection accuracy determination value is calculated in accordance with a ratio of change with time of a state quantity representing the operating state of the engine.

5. The method as in claim 1, wherein:
the regeneration of the particulate filter is allowed under a condition that a ratio of a period, in which the collecting state parameter is greater than the regeneration start value, relative to a certain period is greater than a predetermined period ratio.

6. The method as in claim 5, further comprising:
resetting the predetermined period ratio to be greater as the detection accuracy of the collecting state parameter decreases, in accordance with the detection accuracy determination value.

7. The method as in claim 1, wherein regeneration of the particulate filter is allowed under a condition that a total period in which the collecting state parameter is greater than the regeneration start value is longer than a predetermined period.

8. The method as in claim 7, further comprising:
resetting the predetermined period to be longer as the detection accuracy of the collecting state parameter decreases, in accordance with the detection accuracy determination value.

9. The method as in claim 8, wherein resetting the predetermined period includes:
correcting the predetermined period by a correction period, which is calculated based on a pre-stored correspondence between the detection accuracy determination value and the correction period, and
determining whether the detection accuracy of the collecting state parameter is higher than the threshold detection accuracy or not by comparing the detection accuracy determination value with the threshold value, and prohibiting the correction of the predetermined period if the detection accuracy is determined to be higher than the threshold detection accuracy.

10. A method of cleaning exhaust gas for an internal combustion engine having a particulate filter, which is disposed in an exhaust passage, for collecting exhaust particulate matters included in exhaust gas discharged from cylinders of an engine main body and is regenerated at predetermined timing by eliminating the collected exhaust particulate matters, the method comprising:
detecting an operating state of the engine;
calculating a collecting state parameter, which increases as a quantity of the collected exhaust particulate matters increases, based on the detected operating state;
calculating a detection accuracy determination value as a reference of detection accuracy of the collecting state parameter based on the detected operating state;
resetting a regeneration start value so that the regeneration start value is decreased as the detection accuracy decreases, in accordance with the detection accuracy determination value;
determining whether the collecting state parameter is greater than the regeneration start value or not; and
starting the regeneration of the particulate filter if the collecting state parameter is determined to be greater than the regeneration start value, the regeneration of the particulate filter being allowed under a condition that a ratio of a period, in which the collecting state parameter is greater than the regeneration start value, relative to a certain period is greater than a predetermined period ratio;
resetting the predetermined period ratio to be greater as the detection accuracy of the collecting state parameter decreases, in accordance with the detection accuracy determination value, resetting the predetermined period ratio including:
correcting the predetermined period ratio by a correction ratio, which is calculated based on a pre-stored correspondence between the detection accuracy determination value and the correction ratio, and
determining whether the detection accuracy of the collecting state parameter is higher than the threshold detection accuracy or not by comparing the detection accuracy determination value with the threshold value, and prohibiting the correction of the predetermined period ratio if the detection accuracy is determined to be higher than the threshold detection accuracy.

11. An exhaust gas cleaning system for an internal combustion engine having a particulate filter, which is disposed in an exhaust passage for collecting exhaust particulate matters included in exhaust gas discharged from cylinders of an engine main body and is regenerated at predetermined timing by eliminating the collected exhaust particulate matters, the system comprising:
operating state detector for detecting an operating state of the engine;
collecting state parameter calculator for calculating a collecting state parameter, which increases as a quantity of the collected exhaust particulate matters increases, based on the detected operating state;
detection accuracy determination value calculator for calculating a detection accuracy determination value as a reference of detection accuracy of the collecting state parameter based on the detected operating state;
regenerating start value resetting unit for resetting a regeneration start value so that the regeneration start value is decreased as the detection accuracy decreases, in accordance with the detection accuracy determination value;
regeneration determining unit for determining whether the collecting state parameter is greater than the regeneration start value or not; and
regeneration starting unit for starting the regeneration of the particulate filter if the collecting state parameter is determined to be greater than the regeneration start value;
wherein the regeneration start value resetting unit includes:
regeneration start value correcting unit for correcting the regeneration start value by a correction value, which is calculated based on a pre-stored correspondence between the detection accuracy determination value and the correction value, and correction prohibiting unit for determining whether the detection accuracy is higher than a threshold detection accuracy or not by comparing the detection accuracy determination value with a threshold value, and for prohibiting the correction of the regeneration start value if the detection accuracy is determined to be higher than the threshold detection accuracy.

12. The exhaust gas cleaning system as in claim 11, wherein:
the collecting state parameter is the quantity of the collected exhaust particulate matters, which is calculated based on the detected operating state, and
the regeneration start value is a given value of the quantity of the collected exhaust particulate matters, the given value being stored in the system in advance.

13. The exhaust gas cleaning system as in claim 11, wherein:
the collecting state parameter is pressure of the exhaust gas passing through the particulate filter, which is detected by the operating state detector, and
the regeneration start value is a given value of the pressure of the exhaust gas, the given value being calculated based on the operating state of the engine.

14. The exhaust gas cleaning system as in claim 11, wherein the detection accuracy determination value calculator calculates the detection accuracy determination value in accordance with a ratio of change with time of a state quantity representing the operating state of the engine.

15. The exhaust gas cleaning system as in claim 11, wherein:
the regeneration determining unit allows the regeneration of the particulate filter under a condition that a ratio of a period, in which the collecting state parameter is greater than the regeneration start value, relative to a certain period is greater than a predetermined period ratio.

16. The exhaust gas cleaning system as in claim 15, further comprising:
period ratio resetting unit for resetting the predetermined period ratio to be greater as the detection accuracy of the collecting state parameter decreases, in accordance with the detection accuracy determination value.

17. The exhaust gas cleaning system as in claim 11 wherein:
the regeneration determining unit allows the regeneration of the particulate filter under a condition that a total period in which the collecting state parameter is greater than the regeneration start value is longer than a predetermined period.

18. The exhaust gas cleaning system as in claim 17, further comprising:
predetermined period resetting unit for resetting the predetermined period to be longer as the detection accuracy of the collecting state parameter decreases, in accordance with the detection accuracy determination value.

19. The exhaust gas cleaning system as in claim 18, wherein the predetermined period resetting unit includes:
predetermined period correcting unit for correcting the predetermined period by a correction period, which is calculated based on a pre-stored correspondence between the detection accuracy determination value and the correction period, and
predetermined period correction prohibiting unit for determining whether the detection accuracy of the collecting state parameter is higher than the threshold detection accuracy or not by comparing the detection accuracy determination value with the threshold value, and for prohibiting the correction of the predetermined period if the detection accuracy is determined to be higher than the threshold detection accuracy.

20. An exhaust gas cleaning system for an internal combustion engine having a particulate filter, which is disposed in an exhaust passage for collecting exhaust particulate matters included in exhaust gas discharged from cylinders of an engine main body and is regenerated at predetermined timing by eliminating the collected exhaust particulate matters, the system comprising:
operating state detector for detecting an operating state of the engine;
collecting state parameter calculator for calculating a collecting state parameter, which increases as a quantity of the collected exhaust particulate matters increases, based on the detected operating state;
detection accuracy determination value calculator for calculating a detection accuracy determination value as a reference of detection accuracy of the collecting state parameter based on the detected operating state;
regenerating start value resetting unit for resetting a regeneration start value so that the regeneration start value is decreased as the detection accuracy decreases, in accordance with the detection accuracy determination value;
regeneration determining unit for determining whether the collecting state parameter is greater than the regeneration start value or not;
regeneration starting unit for starting the regeneration of the particulate filter if the collecting state parameter is determined to be greater than the regeneration start value, wherein the regeneration determining unit allows the regeneration of the particulate filter under a condition that a ratio of a period, in which the collecting state parameter is greater than the regeneration start value, relative to a certain period is greater than a predetermined period ratio; and
period ratio resetting unit for resetting the predetermined period ratio to be greater as the detection accuracy of the collecting state parameter decreases, in accordance with the detection accuracy determination value; the period ratio resetting unit including:
period ratio correcting unit for correcting the predetermined period ratio by a correction ratio, which is calculated based on a pre-stored correspondence between the detection accuracy determination value and the correction ratio, and
period ratio correction prohibiting unit for determining whether the detection accuracy of the collecting state parameter is higher than the threshold detection accuracy or not by comparing the detection accuracy determination value with the threshold value, and for prohibiting the correction of the predetermined period ratio if the detection accuracy is determined to be higher than the threshold detection accuracy.

* * * * *